United States Patent
Ginsburg et al.

(10) Patent No.: US 7,249,126 B1
(45) Date of Patent: Jul. 24, 2007

(54) SYSTEMS AND METHODS FOR DYNAMICALLY UPDATING RELEVANCE OF A SELECTED ITEM

(75) Inventors: Adam L. Ginsburg, San Francisco, CA (US); Oren Glickman, Moshav Zofit (IL); Amir Ashkenazi, Los Altos, CA (US)

(73) Assignee: Shopping.com, San Jose, CA (US)

( * ) Notice: Subject to any disclaimer, the term of this patent is extended or adjusted under 35 U.S.C. 154(b) by 347 days.

(21) Appl. No.: 11/025,340

(22) Filed: Dec. 29, 2004

Related U.S. Application Data (60) Provisional application No. 60/533,751, filed on Dec. 30, 2003.

(51) Int. Cl.
*G06F 17/30* (2006.01)
*G06F 7/00* (2006.01)

(52) U.S. Cl. .................. 707/3; 707/5; 707/10; 707/102; 715/513; 715/532; 715/835

(58) Field of Classification Search ................ 707/1–7, 707/9, 10, 100–102; 715/501.1, 513, 532, 715/762, 792, 835, 839, 853
See application file for complete search history.

(56) References Cited

U.S. PATENT DOCUMENTS

| | | | | |
|---|---|---|---|---|
| 5,550,971 A | * | 8/1996 | Brunner et al. | 707/3 |
| 5,893,090 A | * | 4/1999 | Friedman et al. | 707/3 |
| 5,933,145 A | * | 8/1999 | Meek | 715/835 |
| 5,987,446 A | * | 11/1999 | Corey et al. | 707/3 |
| 6,012,053 A | * | 1/2000 | Pant et al. | 707/3 |
| 6,078,924 A | * | 6/2000 | Ainsbury et al. | 707/101 |
| 6,112,202 A | * | 8/2000 | Kleinberg | 707/5 |
| 6,233,578 B1 | * | 5/2001 | Machihara et al. | 707/10 |
| 6,247,008 B1 | * | 6/2001 | Cambot et al. | 707/3 |
| 6,353,822 B1 | * | 3/2002 | Lieberman | 707/3 |

OTHER PUBLICATIONS

Junliang Zhang et al., Evaluation and evolution of a browse and search interface: relation browser, 2005, ACM International Conference Proceeding Series, vol. 89, pp. 179-188.*

Gerard Salton, Dynamic Document processing, Jul. 1972, Communication of ACM, vol. 15, Issue 7, pp. 658-668.*

* cited by examiner

*Primary Examiner*—Jeffrey Gaffin
*Assistant Examiner*—Jacques Veillard
(74) *Attorney, Agent, or Firm*—Joel Weiss; Kaplan Gilman Gibson & Dernier LLP (57) ABSTRACT

Systems and methods for dynamically updating ranking of items retrieved in response to a search query are provided. Specifically, systems and methods according to the invention preferably decrease a value associated with a selected item and increase a value of non-selected items that, prior to the selection, had a lesser weight than the selected item. Alternatively, if the list was ranked from higher value to lowest value, than the selected item would be rewarded by an increase in its score and the non-selected items that previously had a higher value would have their respective values decreased. It should be noted than any and all values and weights described herein may be normalized to ensure appropriate results. Alternative embodiments of the invention are directed to methods and systems for classifying groups of items into meta-products and then updating the rankings of the items based at least in part on the meta-product classification.

21 Claims, 5 Drawing Sheets

SYSTEMS AND METHODS FOR DYNAMICALLY UPDATING RELEVANCE OF A SELECTED ITEM

CROSS REFERENCE TO RELATED APPLICATION

This application claims priority from U.S. Provisional Patent Application No. 60/533,751, filed Dec. 30, 2003.

BACKGROUND OF THE INVENTION

This invention relates to updating the items retrieved by a search engine in response to queries based on search terms.

One of the issues facing Internet shopping search engine providers is how to dynamically update the order of a list of items, alternatively referred to herein as rankings or ranking results, retrieved in response to a shopping search query and/or shopping search term. Specifically, the criteria by which the rankings results are continually updated require careful consideration in order to provide accurate results.

Therefore, it would be desirable to provide a system and method for dynamically updating ranking of items retrieved in response to a search query.

It would also be desirable to provide systems and methods designed to adapt to changing conditions, such as changing user preferences, so that the ranking of items accurately and substantially continually reflects the relevance, and/or other suitable factors, of the retrieved items in response to a search term or search query.

SUMMARY OF THE INVENTION

It is an object of this invention to provide a system and method for dynamically updating ranking of items retrieved in response to a search query.

It is also an object of the invention to provide systems and methods designed to adapt to changing conditions, such as changing user preferences, so that the ranking of items accurately and substantially continually reflects the relevance (which may include an estimate of the relevance), and/or other suitable factors, of the retrieved items in response to a search term or search query.

Systems and methods according to the invention preferably include two aspects. First, the systems and methods solve a core problem of ranking documents retrieved in response to a search query. Secondly, the ranking is preferably dynamically updated such that users are provided with the most current items in response to their search query. It should be noted that queries according to the invention, which are preferably used as data filters to obtain a results set, may be based on user keywords, category selections (or other suitable browsing-related actions) that the user chooses or that are associated with the user keywords, and attribute values of the items returned in response to the keywords and the browsing-related actions (or the attribute values being derived in some other suitable fashion).

More specifically, it is also an object of the invention to provide systems and methods for updating the order of display of a plurality of items, the items that may be retrieved in response to a search query. A selection of one of the plurality of items may be received. In response to the selection, a value of the selected item with respect to the search query may be adjusted and a value of each of the plurality of items that may be displayed in a higher position than the selected item with respect to the search query may be adjusted. A list of the plurality of items may be displayed in response to the search query where the order of the list may be based on the value associated with each of the items.

It is another object of the invention to provide systems and methods for updating the order of display of items, the items being classified into a plurality of groups based on item characteristics, the items that may be retrieved in response to a search query. The order of the groups based on a value that represents each of the groups may be updated. In response to the user selection of one of the items retrieved by the query, a value of a group that includes the selected item may be adjusted and the value of each of the groups that may be displayed in a higher position with respect to the search query than the group that includes the selected item may also be adjusted. A list of the plurality of items may be displayed in response to the search query where the order of the list may be based at least in part on the value associated with each of the groups.

It is another embodiment of the invention to provide a method for classifying a set of items into meta-products. Preferably, the items were retrieved in response to a search query. The method may include calculating a plurality of feature weights with respect to the user query, the feature weights being based at least in part on historical behavioral data, the plurality of feature weights corresponding to a plurality of features included in the items. The method may also include selecting a first feature based at least in part on the calculating. The method may also include partitioning the items into a first group and a second group, each of the items in a first group including the first feature and each of the items in a second group not including the first feature.

The method may then repeat the partitioning until a threshold number of groups are formed wherein each of the groups represents a quantity of historical behavioral data, the quantity being within a predetermined range or below a particular threshold. Finally, the method preferably ranks the items within each group based on the respective feature weights of each of the items.

BRIEF DESCRIPTION OF THE DRAWINGS

The above and other advantages of the invention will be apparent upon consideration of the following detailed description, taken in conjunction with the accompanying drawings, in which like reference characters refer to like parts throughout, and in which.

DETAILED DESCRIPTION OF THE INVENTION

The algorithms described herein relate to a method for dynamically updating a ranking of items which are retrieved in response to a keyword term or multiple keyword search. The systems and methods that implement the updating algorithm according to the invention preferably obtain advantages for users—e.g., by increasing the accuracy of their respective searches and reducing navigation time—and for item providers—e.g., by increasing traffic to, and purchases from, their respective websites. One purpose of the systems and methods according to the invention is to achieve the aforementioned advantages by utilizing historical behavioral data to more accurately rank results in response to a query.

It should be noted that while the examples of this patent application deal primarily with updating search results ranking from Internet shopping search engines, the principles described and claimed herein may relate to any suitable search engine results updating system.

Another of the benefit of systems and methods according to the invention is that they provide a low maintenance, yet preferably substantially continuous, updating of ranking-based techniques. These techniques represent one type of implicit relevance feedback.

Figure 1:
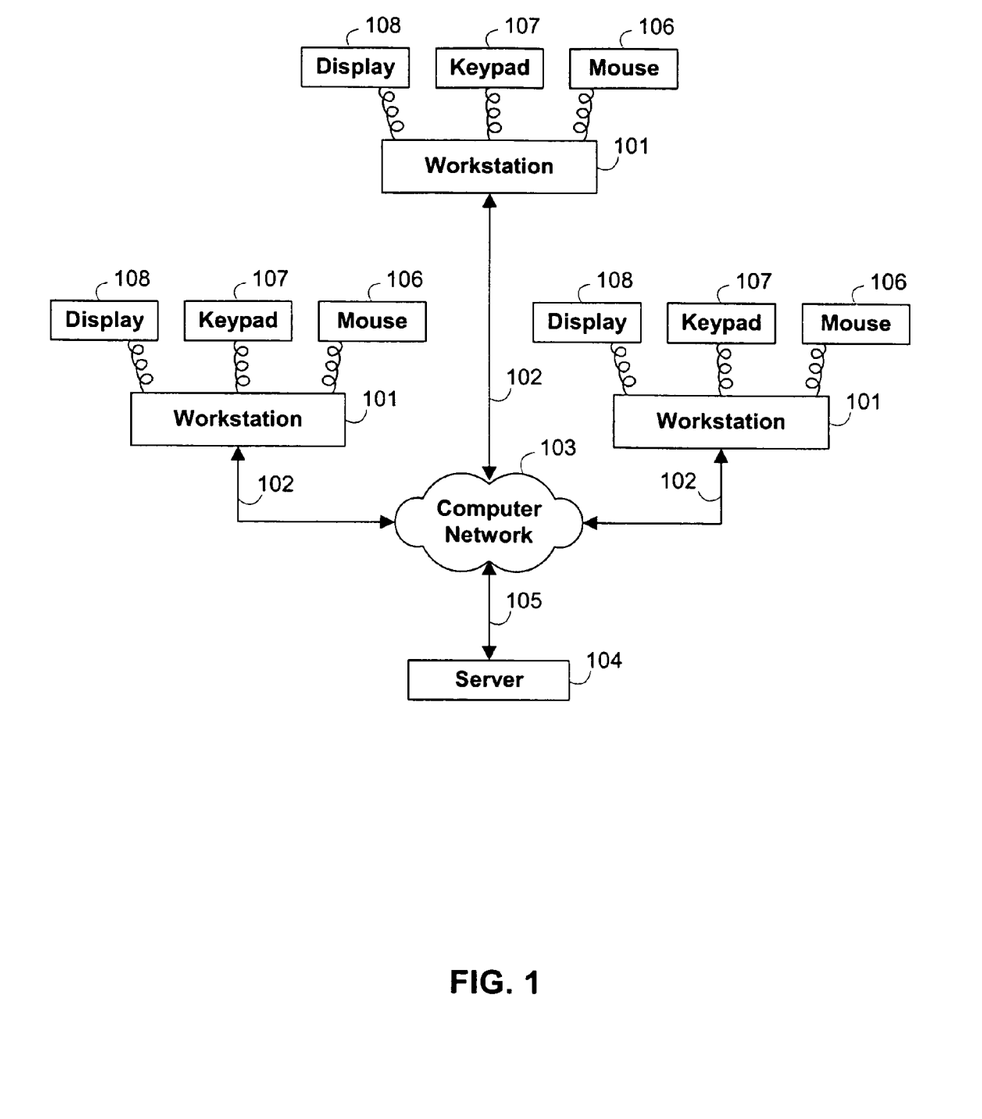
FIG. 1 is an illustration of an electronic implementation of a software system according to the present invention.

Referring to FIG. 1, exemplary search results updating system 100 for implementing the present invention is shown. As illustrated, system 100 may include one or more workstations 101. Workstations 101 may be local or remote, and are connected by one or more communications links 102 to computer network 103 that is linked via communications links 105 to server 104.

In system 100, server 104 may be any suitable server, processor, computer, or data processing device, or combination of the same. Server 104 may form part of the search results updating system. Furthermore, server 104 may also contain the search results updating system and merely transmit a Graphical User Interface or other display screens to the user at user workstation 101.

Computer network 103 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 102 and 105 may be any communications links suitable for communicating data between workstations 101 and server 104, such as network links, dial-up links, wireless links, hard-wired links, etc.

Workstations 101 may be personal computers, laptop computers, mainframe computers, dumb terminals, data displays, Internet browsers, Personal Digital Assistants (PDAs), two-way pagers, wireless terminals, portable telephones, etc., or any combination of the same. Workstations 102 may be used to implement the electronic search results updating system according to the invention.

Figure 2:
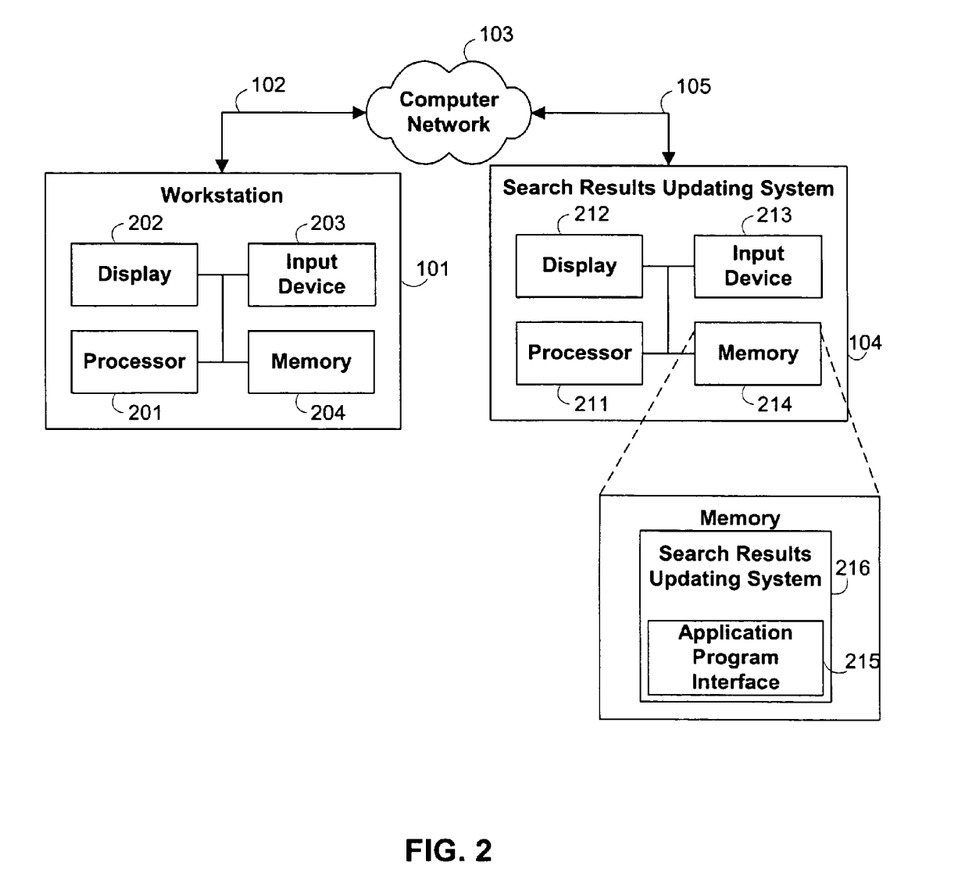
FIG. 2 is a block diagram of a workstation and a server that may be used to implement the processes and functions of certain embodiments of the present invention.

The server and one of the workstations, which are depicted in FIG. 1, are illustrated in more detail in FIG. 2. Referring to FIG. 2, workstation 101 may include processor 201, display 202, input device 203, and memory 204, which may be interconnected. In a preferred embodiment, memory 204 contains a storage device for storing a workstation program for controlling processor 201. Memory 204 also preferably contains a search results updating application 216 according to the invention.

Search results updating application 216 may preferably include application program interface 215, or alternatively, as described above (and as shown in FIG. 2), search results updating application 216 may be resident in the memory of server 104. The only distribution to the user may be a Graphical User Interface which allows the user to interact with search results updating application 216 resident at server 104.

Processor 201 uses the workstation program to present on display 202 information relating to merchant websites or other search results updating conditions received through communication link 102 and commands, queries and navigational instructions or other suitable information transmitted by a user of workstation 101. Furthermore, input device 203 may be used to manually enter commands, queries and navigational instructions in order for these commands, queries and navigational instructions to guide the user through the search results updating system.

One embodiment of the algorithm that is used for dynamically updating search results retrieved in response to a search term (or group of terms) is as follows: For each user selection (or other suitable metric such as the amount of revenue (amount paid by merchant for association of item with a particular search query)) related to a particular item, a combination of selection and revenue, average time spent by user on a particular item, or some combination of selection, revenue and time related to a particular item the selected item is subject to the following change:

$$W=W+\mathrm{alpha}(t-W)$$

where:

W=the current weight (or value) associated with that item.

t=1 alpha=a scaling factor, indicating how much reward a selection imparts on the selected item.

All items above the selected one—e.g., in this example, the items above the selected item have smaller weights—are subject to the following modification:

$$W=W+\mathrm{beta}(t-W)$$

where:

W=the current weight for that item.

t=the position of the current item+1 beta=a scaling factor, indicating how much punishment a selection imparts on those above it. For example, consider the following ordering solution:

| ITEM | WEIGHT |
|---|---|
| Merry | 1 |
| Pippin | 2 |
| Frodo | 3 |
| Bilbo | 4 | and where alpha=0.2, beta=0.2.

Now Frodo is selected,

For Merry, the new weight is 1+0.2(2−1)=1.2

For Pippin, the new weight is 2+0.2(3−2)=2.2

For Frodo, the new weight is 3+0.2(1−3)=2.6

Bilbo stays the same, because he is below the selected item.

Thus, following the selection of Frodo, the updated weights for all the items will be:

| ITEM | WEIGHT |
|---|---|
| Merry | 1.2 |
| Pippin | 2.2 |
| Frodo | 2.6 |
| Bilbo | 4 |

In both cases, t can be considered as the desired position for each item, respectively: for the selected item, the desired position is 1, for the items above the selected item, it is one lower than where each of the items was before the selection, alpha and beta are indicators of the incremental effect of a single selection with respect to moving each item towards its desired positions.

Addition

In some embodiments of the invention, new items may only be added to the list when selected, and the weight the new item receives may be 1+(# of items in ordering solution)

For example, continuing from the above example:

| ITEM | WEIGHT |
|---|---|
| Merry | 1.2 |
| Pippin | 2.2 |
| Frodo | 2.6 |
| Bilbo | 4 |

When "Samwise" is picked, it gets added with a weight of 1+4=5:

| ITEM | WEIGHT |
|---|---|
| Merry | 1 |
| Pippin | 2 |
| Frodo | 3 |
| Bilbo | 4 |
| Samwise | 5 |

An alternative embodiment of an algorithm according to the invention may be as follows. By reversing the order of the relative starting weights of each of the selections—i.e., Merry=4, Pippin=3, Frodo=2 and Bilbo=1, and switching the signs of alpha and beta to a negative number, the adjustments of an algorithm according to the invention will perform in a substantially similar fashion as that set forth above but the order will be reversed. When the list may be presented to a user, the members of the list may be displayed from greatest to smallest as opposed to from smallest to greatest. Other such modifications may be made to the algorithm without departing from the spirit of the invention.

Figure 3:
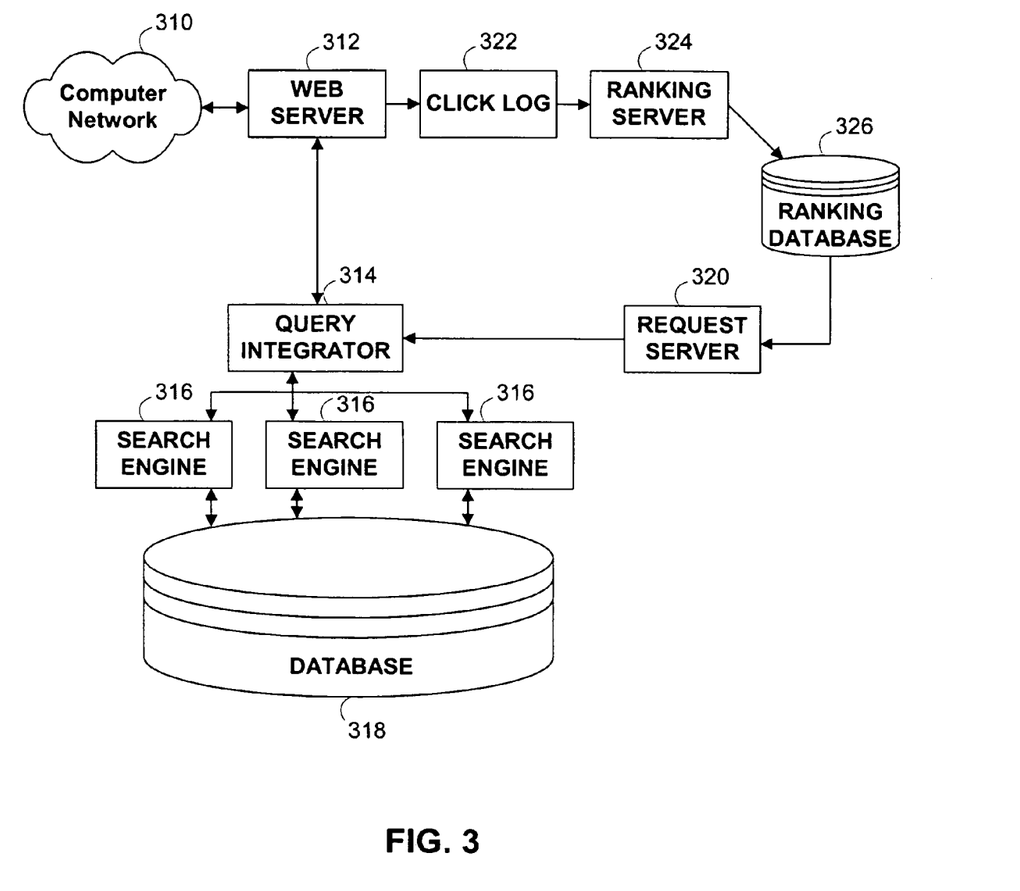
FIG. 3 is a schematic diagram of another electronic implementation of a software/hardware system according to the invention.

FIG. 3 shows a more detailed schematic diagram of an implementation of a software/hardware system according to the invention. 310 shows a portion of a computer network from which a search query may be received. The search query may be transmitted to a Web server 312 or other appropriate device.

The search query may then be directed to query integrator 314. Query integrator 314 may access one or many search engines 316. Search engines 316 preferably communicate with a first database 318 to retrieve a plurality of items in response to the search query. The plurality of items may then be returned to query integrator 314.

The information available to request server 320 may be derived at least in part based on an algorithm according to the invention in combination with a history of user selections (or other suitable metrics) associated with the same query or similar queries. This process, referred to herein as a ranking updating loop, will be explained in more detail below.

Once query integrator 314 has retrieved the ranking of the list of retrieved items, preferably from request server 320, and query integrator has integrated the ranking information with the list of retrieved items, the ranked list is then presented to the user preferably via web server 312. The user then may select a desired item from the list.

Once a selection (or other suitable metric) has been received, the ranking updating loop may preferably be implemented as follows. Once a user selects one of the items, his selection, along with the query that he submitted, is transmitted to click log 322.

Then, click log 322 preferably transmits the user selection, at least a portion of the non-selected items and their position on the list with respect to the selected item, and the query, to the search results ranking server 324. One purpose of the search results ranking server 324 implementation algorithm is to update the weight or value associated with at least a portion of the retrieved items relative to the query.

Once server 324 has updated the respective weights of the retrieved items relative to the query submitted, the results are then transmitted to ranking database 326. Ranking database 326 preferably stores the respective weights associated with each of the items relative to a particular query. Ranking database 326 may only include a portion of the items that are resident in database 318 because ranking database 326 includes only those items that may have been selected by a system user at least once, whereas database 318 may even include items that have never been selected by a system user.

It should be noted that in the embodiment shown in FIG. 3, the items may preferably be indexed by query such that any ranking results associated with a particular item are relative to a query submitted by the user. In one embodiment of the invention, multiple queries may be normalized (or, alternatively, simplified) in order to reduce the amount of queries against which the items are indexed. In this embodiment, multiple related queries may preferably return the same results set.

One method of normalization is commonly referred to as "stemming." Stemming a query preferably reduces a multiple word query into a single word or term at the "stem" of the query. In so doing, the number of indexing queries is preferably reduced, thereby reducing the number of entries in the ranking database.

Alternatively, the items in the ranking database may not be indexed to queries at all. Rather, the items may simply have a "user selection weight" or other suitable weight associated with them. In such an embodiment, the items are preferably ranked according to their respective user selection weights.

With respect to the other parts of the system, ranking database 326 preferably is available to request server 320 to provide information relating to a set of items that was retrieved in response to a given search query. Thus, when a search query is entered into the system, query integrator 314 receives a number of items from search engines 316 in response to the search query, and then uses the information accessible through request server 320 to rank the items. When the user selects one of the items, this selection information may be again sent through the updating loop for use in ranking items retrieved in other searches. The other similar searches may be either similar to or different from the searches originally searched.

Thus, an implementation of a software/hardware system according to the invention that retrieves items in response to a search query and ranks the items according to an item weight or other suitable metric has been shown.

In yet another aspect of the invention, products may be ranked in response to a user query based on evaluating the relevance of their individual features to the query. The term feature is defined herein to include preferably any word in a product name as provided by the merchant, a category associated with the item or other suitable browsing-type characteristic, or product attribute.

For example, in response to a query for a "dress shirt," a number of items may be retrieved to form a results-set. Separately, a historical database of merchant click data is also queried to retrieve a list of merchant clicks (or other suitable events indicating user interest in a particular item) that have occurred in response to earlier examples of the same query. Then, a particular attribute such as color (e.g., blue or white) or style (e.g., button down collar or straight collar) may be analyzed as follows. A ratio may be obtained wherein the ratio is characterized by the percentage of products with merchant clicks that contain the feature white divided by a percentage of all products returned by the query that contain the feature white. An exemplary ratio may be equal to 0.9/0.4=2.25. An alternative embodiment of this formula may raise the ratio to a power between zero and one depending on the number of product results in the query which include the feature—i.e., the more products that contain the feature, the closer the exponent is to one. Then, a ratio may be obtained for other features whereby a listing of ratios (in response to the search query "dress shirt") may be as follows:

1. White=2.25
2. Long sleeve=2.45
3. Short sleeve=0.75
4. Blue=0.95

According to this method, a product including the features white and short sleeve possesses a value of 1.69 (by multiplying 2.25×0.75), while a product containing the features white long sleeve possesses a value of 5.51 (by multiplying 2.25×2.45). As such, the products can be ranked in response to the query based on their respective scores.

One issue that may arise using merchant click data (the method and approach for which will be explained in more detail below in the text corresponding to FIG. 4) is that individual queries may not retrieve a group of results sufficiently large to accurately represent historical user interest. In some of these cases, it may be appropriate to augment the original query entered by the user (either through keyword, browsing-type, attribute value or other suitably formed query) by automatically providing related narrower queries that retrieve a larger volume of historical merchant click data so as to form a suitable results set for the querying user. For example, if the keyword query of "Nike" may retrieve insufficient historical data, systems and methods according to the invention may automatically provide all, or some subset of all, the narrower, yet related queries, each of which informs the broader query. A list of the most relevant, yet narrower, keyword queries may include "Nike watches", "Nike Shox running shoes", "Nike golf shoes", "Nike golf clothing", and "Nike cross trainer shoes". Based on the narrow searches, the system may more easily return relevant results by more accurately approximating historical user interest.

In an alternative embodiment of the invention, instead of using merchant click data as the indication of user interest, user query data may be used to indicate user interest. In this method, rather than using ratios of feature frequency in the merchant click data (as set forth above) to probe historical user interest and thereby rank results, it may be preferable to use feature frequency within user query data to indicate user interest and thereby rank results. Using this method, the weight of each feature may be calculated as the number of queries related to the present query that contain the feature divided by the total number of queries related to the present query. More specifically, in this method feature weights (which are used to rank returned items) may depend on the ratio of the number of queries that contain the feature to the total number of queries. Thereafter, the weights of the features for a given item may be summed to form a total weight for the item. Then, the items can be ranked by the total weight.

In an alternative embodiment of this method, the results may be weighted based on the merchant click data associated with the queries. This approach preferably relies substantially wholly on the above-described method of incorporating more specific queries to find relevant data for feature weight calculations.

The following illustrates the application of the user query data method to approximate user interest and thereby rank results. The above-described example of Nike™ products preferably shows a group of queries from which user interest for the general query of "Nike" can be determined. In the above-described example, a partial list of the feature weights may preferably be determined as follows:

| FEATURE | NUMBER OF QUERIES | WEIGHT |
| --- | --- | --- |
| clothing | 1 | 0.2 |
| shoes | 3 | 0.6 |
| golf | 2 | 0.4 |
| running | 1 | 0.2 |
| Shox | 1 | 0.2 |

The resulting feature weights may be applied to different user queries. For example, a first product named "Nike air running shoes" may preferably have a total weight of 0.0 (air)+0.2 (running)+0.6 (shoes)=0.8 with respect to the user query for "Nike". (The "Nike" term in the product name is ignored because all products returned for this query include the term "Nike".) A second product named "Nike running shorts" may preferably have a total weight of 0.2 (running)+ 0.0 (shorts)=0.2. Thus, for the query "Nike", the product named "Nike air running shoes" may preferably be ranked higher than the product named "Nike running shorts".

One issue that arises with such a ranking of results is that, while a majority, or at least a substantial minority, of users may be interested solely in items containing the top-ranked features, many other users are desirous of seeing other types of products, albeit some of which may be less popular overall, in response to users' respective search queries. The meta-product aspect of the invention, described next, helps to increase the number of users satisfied by one or more products in the query result by increasing the diversity of the results (i.e., the number of different types of products listed in the results).

In accordance with this aspect of the invention, products in a results set may be arranged into groups based on the presence or absence of specific product features. For example, in response to the search query, "dress shirt", the results may preferably be divided into groups, each of which that captures a certain portion of historical user interest. One group of products could be defined by the features white, long sleeve, and cotton. Another group may be defined by the features blue and short sleeve, and not made of cotton. In this way, the organization of the retrieved items is not product-based on the highest level, but rather based on "meta-products" (a meta-product being defined as a representation of a class of products, each of the products in the class sharing at least some common features (or common lacking of specific features)).

Furthermore, the products contained within each meta-product are ranked in a priority order based on the weight of their respective features, as explained previously. The purpose of this ranking is to estimate which items in each meta-product are of the highest interest to users who may have submitted the same query.

In this aspect of the invention, search results are arranged into a certain number of meta-products, e.g. ten, and then only a predetermined number, e.g., two, of the products belonging to the first meta-product are displayed. Thereafter, a predetermined number, e.g., two, of items belonging to the next most relevant meta-product may be shown, and so on for each meta-product. Thus, the retrieved products are shown to the user in a modified order based on the most relevant products that qualify within each meta-product.

Figure 4:
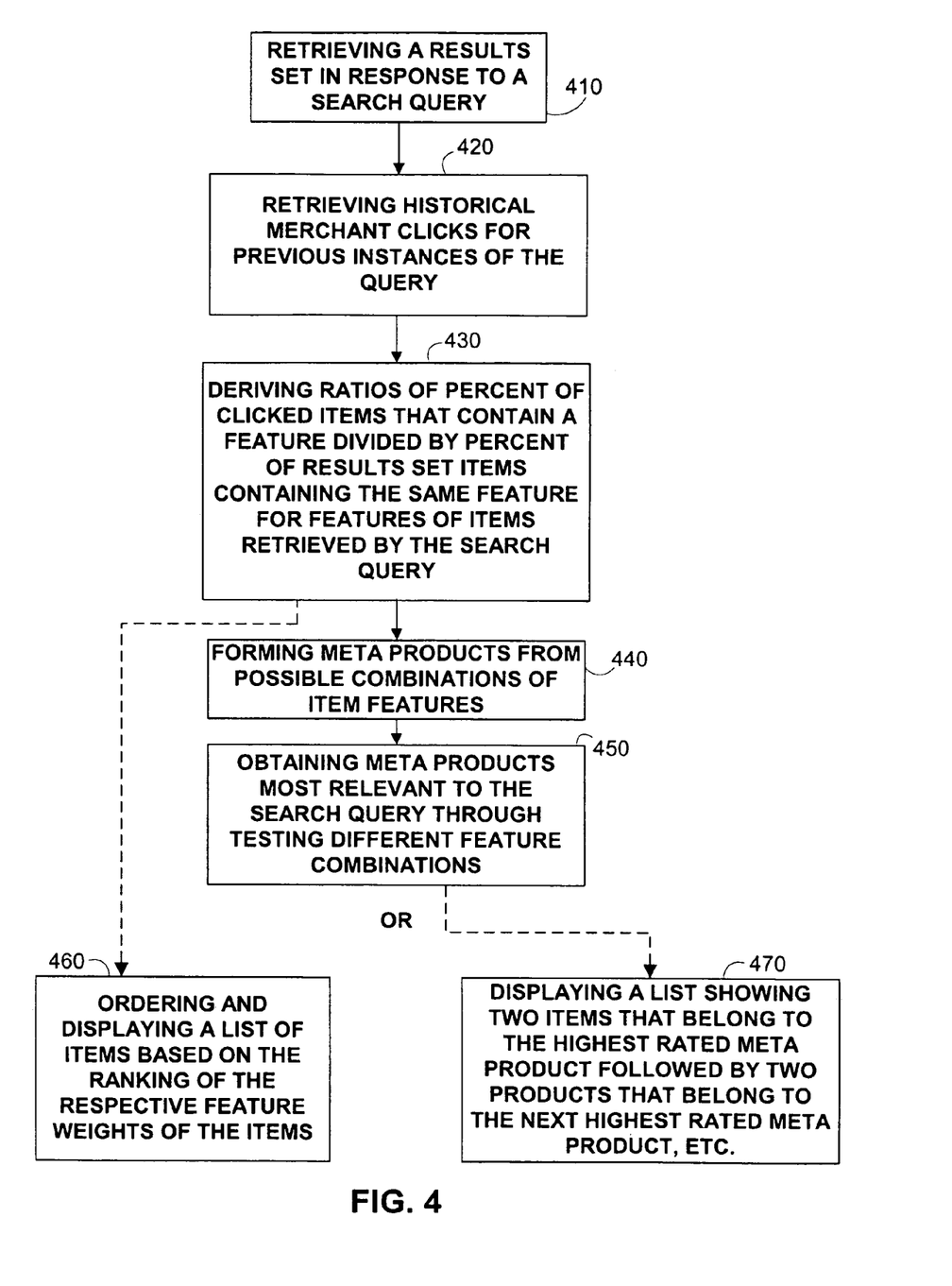
FIG. 4 is a flow diagram of a method according to the invention.

FIG. 4 shows a flow chart which illustrates the immediately previously-described embodiment of a method according to the invention. Step 410 shows that a results set is retrieved in response to a search query. Thereafter, the method includes retrieving historical merchant clicks for previous instances of the query, as shown in step 420. Merchant clicks represent user selections of particular items that were retrieved in the search results (these clicks preferably send a user to a merchant site). Step 430 shows deriving ratios of percentage of merchant clicks to percentage of results set for attributes of items retrieved by the search query (as described in detail above). Once a sufficient number of ratios have been derived, step 440 shows forming meta-products from possible combinations of item features. The output steps 460 and 470 preferably include either ordering and displaying a list of items based on the ranking of the respective features of the items or displaying a list showing two items that belong to the highest rated meta-product followed by two products that belong to the next highest rated meta-product.

According to yet another embodiment of the invention, the most relevant meta-products may be obtained through testing different feature combinations, as shown in step 450. Once the most relevant meta-products are derived, the items may be displayed such that the items included with the most relevant meta-products are displayed to the user at the top of a list of items retrieved in response to the search query, "dress shirt". This step is shown in step 470.

The solution to this problem, as described in more detail above, culminates in step 470. Step 470 shows displaying two items that belong to the highest rated meta-product, and then displaying two products that belong to the next highest rated meta-product, etc. In this way the sorting occurs at the meta-product level, but the display provides a user with variety of results.

Figure 5:
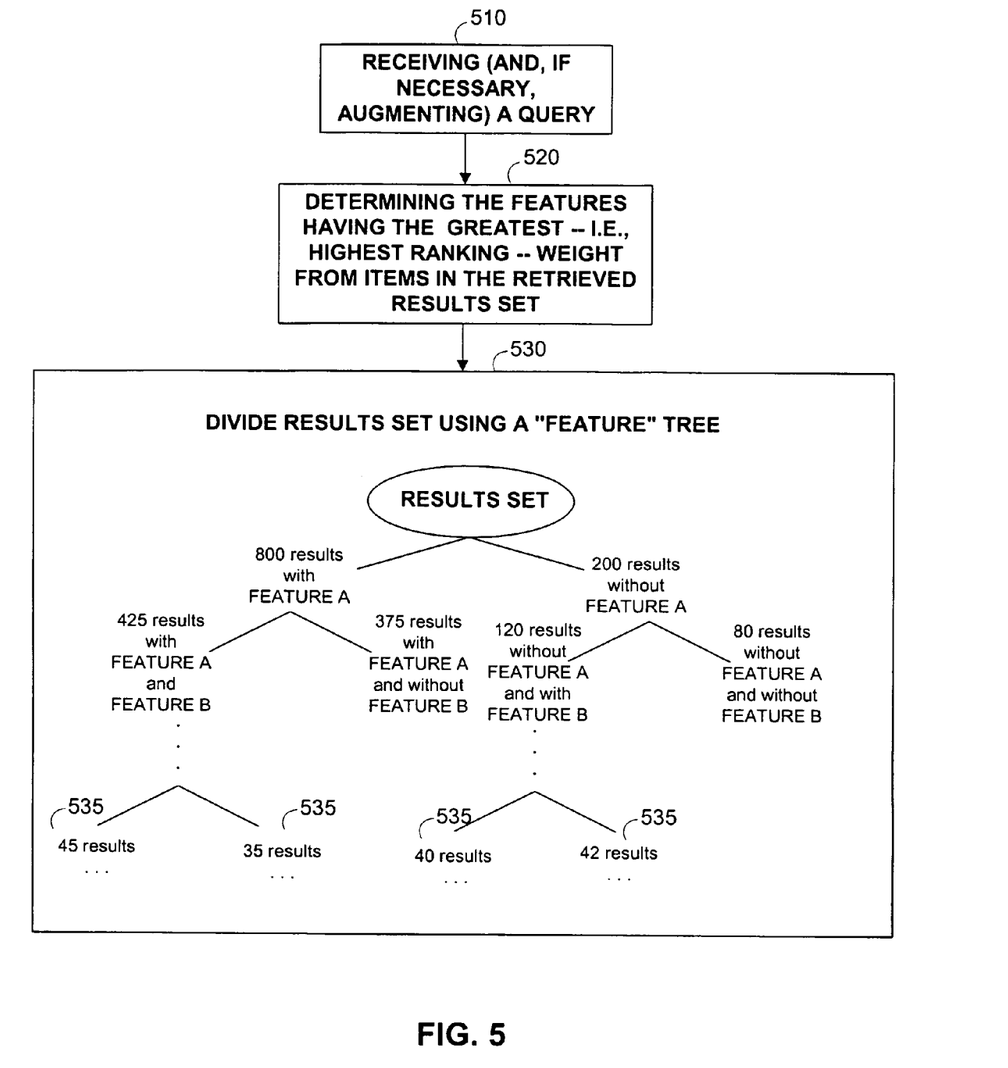
FIG. 5 is a flow diagram of another method according to the invention.

The method for forming and ranking meta-products is shown in FIG. 5. Step 510 shows receiving (and, if necessary, augmenting) a query. Step 520 shows determining the features having the greatest weight in the retrieved results set (in one embodiment this determination is obtained using the ratio described above in step 430 of FIG. 4). Then the total results set obtained by the query is divided using a tree, as shown in step 530, whereby different combinations of features are used to provide a "leaf" 535. Each leaf reflects a group of items that share (or share a lacking of) a particular one or more features. The one or more features (or lacking thereof) in each of leaves 535 define a meta-product. Preferably, the meta-products that include the most relevant groups of features should be listed first in the user display and other meta-products are selected to provide an even distribution of historical behavioral data across a predetermined target number of meta-products. Once the relevant meta-products are obtained, the items within the relevant meta-products are ordered by using the same or similar criteria—i.e., obtaining product weights based on feature weights—used to determine the most relevant meta-products.

A tree of meta-products may be constructed according to the invention by applying one of the methods described above for calculated feature weights with respect to results set returned by the query. The process for forming a tree may include: first, calculating feature weights for query results, choosing the feature with the highest weight, and then partitioning the results set into two groups, one that contains all items with the feature and one that contains all items without the feature. The process may continue recursively on each of these two groups: selecting the highest weighted feature within the products that include the previously-determined highest weighted feature and then partitioning based on this selection, and selecting the (possibly different) highest weighted feature within the products that do not include the previously-determined highest weighted feature and then partitioning this group based on this selection (See FIG. 5).

The total number of meta-products—in this embodiment shown as leaves 535 on a tree—may be limited to a predetermined number of meta-products. Preferably, a linking button with terms like, "show more of these" may be provided to a user to allow the user to implement a desire to see more items from a meta-product associated with a particular item. Alternatively, the number of meta-products may be limited to meta-products that represent a group of items that includes more (or less) than a threshold amount of historical behavioral data, such as historical merchant click records.

It will be understood that the foregoing is only illustrative of the principles of the invention, and that various modifications can be made by those skilled in the art without departing from the scope and spirit of the invention, and the present invention is limited only by the claims that follow.

What is claimed is:

1. A system for updating the order of display of a plurality of items, the items that were retrieved in response to a search query, the system comprising:
    a server comprising:
        a server storage device;
        a server processor connected to the server storage device, the server storage device storing a server program for controlling the server processor; and
        wherein the server is operative to communicate with each of a plurality of workstations, each of the workstations comprising:
    a workstation storage device;

a workstation processor connected to the workstation storage device, the workstation storage device storing a workstation program for controlling the workstation processor; and the workstation processor operative with the workstation program to:

display the plurality of items;

receive a selection of one of the plurality of items;

the server processor operative with the server program to update the order of display of the plurality of items in response to the selection, the updating comprising:

adjusting a value of the selected item with respect to the search query;

adjusting a value of each of the plurality of items that are displayed in a higher position than the selected item with respect to the search query; and the workstation processor further operative with the workstation program to display a list of the plurality of items in response to the search query, the order of the list being based on an adjusted value associated with each of the items.

2. The system of claim 1 wherein the adjusting the value of the selected item with respect to the search query comprises increasing the value of the selected item and the adjusting the value of each of the plurality of items that are displayed in a higher position than the selected item with respect to the search query comprises decreasing the value of each of the plurality of items that are displayed in a higher position than the selected item.

3. The system of claim 1 wherein the adjusting the value of the selected item with respect to the search query comprises decreasing the value of the selected item and the adjusting the value of each of the plurality of items that are displayed in a higher position than the selected item with respect to the search query comprises increasing the value of each of the plurality of items that are displayed in a higher position than the selected item.

4. The system of claim 1 further comprising updating the order of the list based on the adjusting the value of the selected item and the adjusting the value of each of the plurality of items that are displayed in a higher position than the selected item.

5. The system of claim 1 wherein the value of each of the plurality of items is based at least in part on a relevance of each of the items to the search query.

6. The system of claim 1 wherein the order of the list is based at least in part on the revenue generated by each of the plurality of items on the list.

7. The system of claim 1 wherein each of the plurality of items represents features of goods.

8. The system of claim 1, the server processor is further operative with the server program to add a new item to the plurality of items.

9. The system of claim 8, wherein the adding the new item comprises attributing a value to the new item that causes the new item to be displayed.

10. The system of claim 1, wherein the server processor is further operative with the server program to normalize a plurality of different queries wherein in response to each of the plurality of normalized queries the same plurality of items is returned.

11. A method for updating the order of display of items, the items being classified into a plurality of groups based on item characteristics, the items that were retrieved in response to a search query, the method comprising:

updating the order of the groups based on a value that represents each of the groups;

in response to a user selection of one of the items retrieved by the search query:

adjusting a value of a group that includes the selected item; and adjusting the value of each of the groups that are displayed in a higher position with respect to the search query than the group that includes the selected item; and displaying a list of the plurality of items in response to the search query, the order of the list being based at least in part on the value associated with each of the groups.

12. The method of claim 11 wherein the adjusting a value of the selected group with respect to the search query comprises increasing the value of the selected group and the adjusting a value of each of the plurality of groups that are displayed in a higher position than the selected group with respect to the search query comprises decreasing the value of each of the plurality of groups that are displayed in a higher position than the selected group.

13. The method of claim 11 wherein the adjusting a value of the selected group with respect to the search query comprises decreasing the value of the selected group and the adjusting a value of each of the plurality of groups that are displayed in a higher position than the selected group with respect to the search query comprises increasing the value of each of the plurality of groups that are displayed in a higher position than the selected group.

14. The method of claim 11 further comprising updating the order of the list based on the adjusting the value of the selected group and the adjusting a value of each of the plurality of groups that are displayed in a higher position than the selected item.

15. The method of claim 11 wherein the value of each of the plurality of groups is based at least in part on a relevance of each of the groups to the search query.

16. The method of claim 11 wherein the order of the list is based at least in part on the revenue generated by each of the plurality of items on the list.

17. The method of claim 11, further comprising adding a new group to the plurality of groups.

18. The method of claim 17, wherein the adding the new group comprises attributing a value to the new group that causes the new group to be displayed at the bottom of the list.

19. The method of claim 11, further comprising displaying at the top of the list a portion of the items in the group with the highest value.

20. The method of claim 11, further comprising displaying at the top of the list a portion of the items in the group with the lowest value.

21. The method of claim 11, further comprising normalizing a plurality of different queries wherein in response to each of the plurality of normalized queries the same plurality of items is returned.

* * * * *